United States Patent [19]

DuLac

[11] Patent Number: 4,965,801
[45] Date of Patent: Oct. 23, 1990

[54] ARCHITECTURAL ARRANGEMENT FOR A SCSI DISK CONTROLLER INTEGRATED CIRCUIT

[75] Inventor: Keith B. DuLac, Derby, Kans.

[73] Assignee: NCR Corporation, Dayton, Ohio

[21] Appl. No.: 101,452

[22] Filed: Sep. 28, 1987

[51] Int. Cl.$^5$ .................... G06F 13/00; G06F 13/28; G06F 11/00
[52] U.S. Cl. .................... 371/40.1; 364/200; 364/900; 364/238.3; 364/239.7; 364/244.6; 364/926.93; 364/939.3; 364/926.3
[58] Field of Search ... 364/200 MS File, 900 MS File; 371/40.1

[56] References Cited

U.S. PATENT DOCUMENTS

| H696 | 10/1989 | Davidson | 364/900 |
|---|---|---|---|
| 4,313,162 | 1/1982 | Baum et al. | 364/200 |
| 4,399,503 | 8/1983 | Hawley | 364/200 |
| 4,417,304 | 11/1983 | Dinwiddie, Jr. | 364/200 |
| 4,574,346 | 3/1986 | Hartung | 364/200 |
| 4,674,037 | 6/1987 | Funabashi et al. | 364/200 |
| 4,688,166 | 8/1987 | Schneider | 364/200 |
| 4,775,969 | 10/1988 | Osterlund | 364/200 |
| 4,805,097 | 2/1989 | De Sanna | 364/200 |
| 4,843,544 | 6/1989 | DuLac et al. | 364/200 |
| 4,870,643 | 9/1989 | Bultman et al. | 371/11.1 |
| 4,878,183 | 10/1989 | Ewart | 364/200 |

Primary Examiner—Gareth D. Shaw
Assistant Examiner—Gopal C. Ray
Attorney, Agent, or Firm—Wilbert Hawk, Jr.; Jack Penrod

[57] ABSTRACT

A SCSI disk controller integrated circuit (SDC IC) provides much of the hardware necessary to perform asynchronous data transfers between a SCSI host bus and a disk interface circuit through two on-chip rotating buffers. The SDC IC is designed to be used in conjunction with a microprocessor and a stored microprocessor program. The SDC IC with its numerous registers reduce external parts by allowing some of the SCSI disk controller functions to be performed in software rather than hardware. On-chip sequence controllers and the rotating buffers of the SDC IC help the microprocessor to separate the control functions and the data transfer functions in order to maximize data transfer throughput. By arranging the control registers, the rotating buffers, and the sequence controller on a single integrated circuit a high performance, compact and inexpensive disk controller can be built using the SDC IC, a microprocessor and a small number of additional integrated circuits.

11 Claims, 11 Drawing Sheets

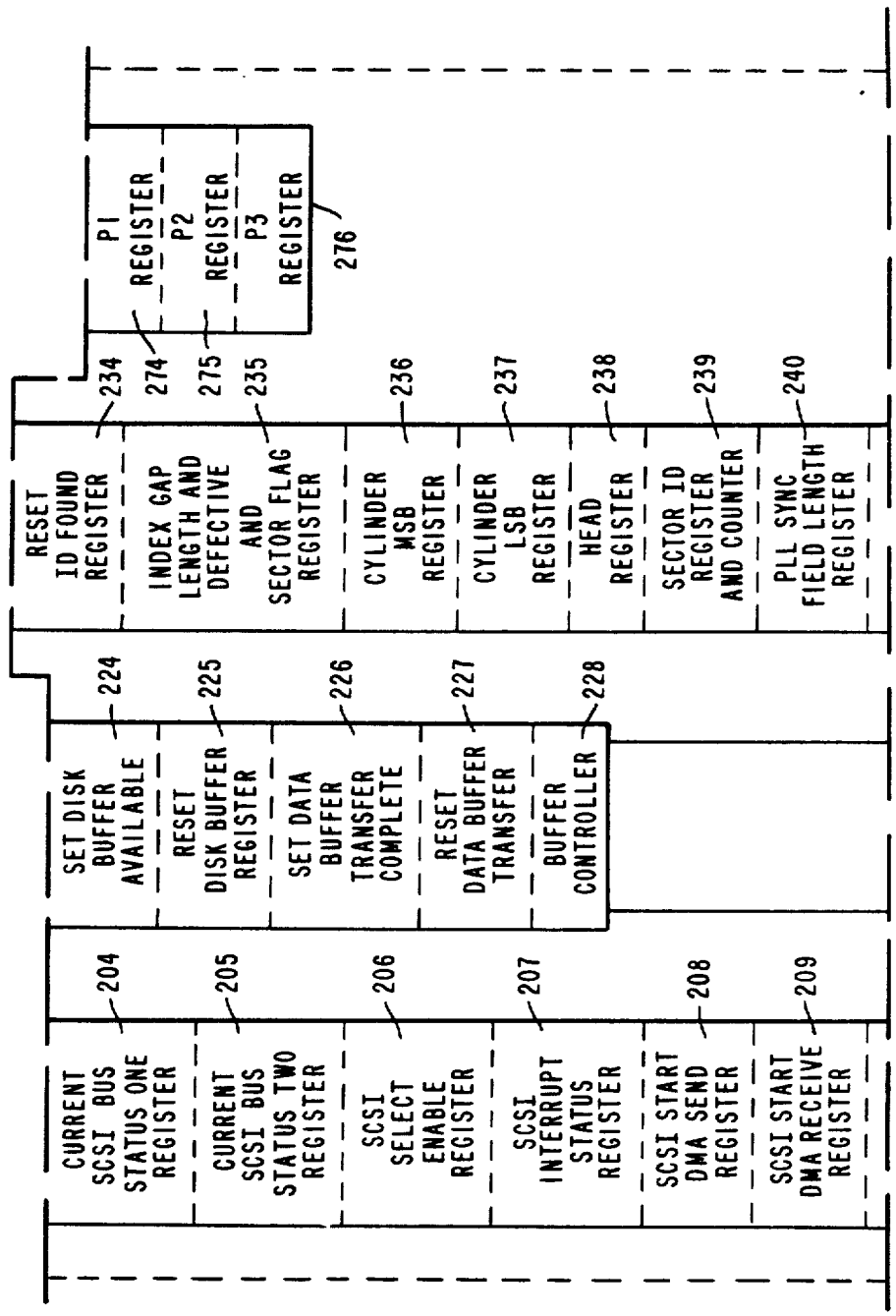

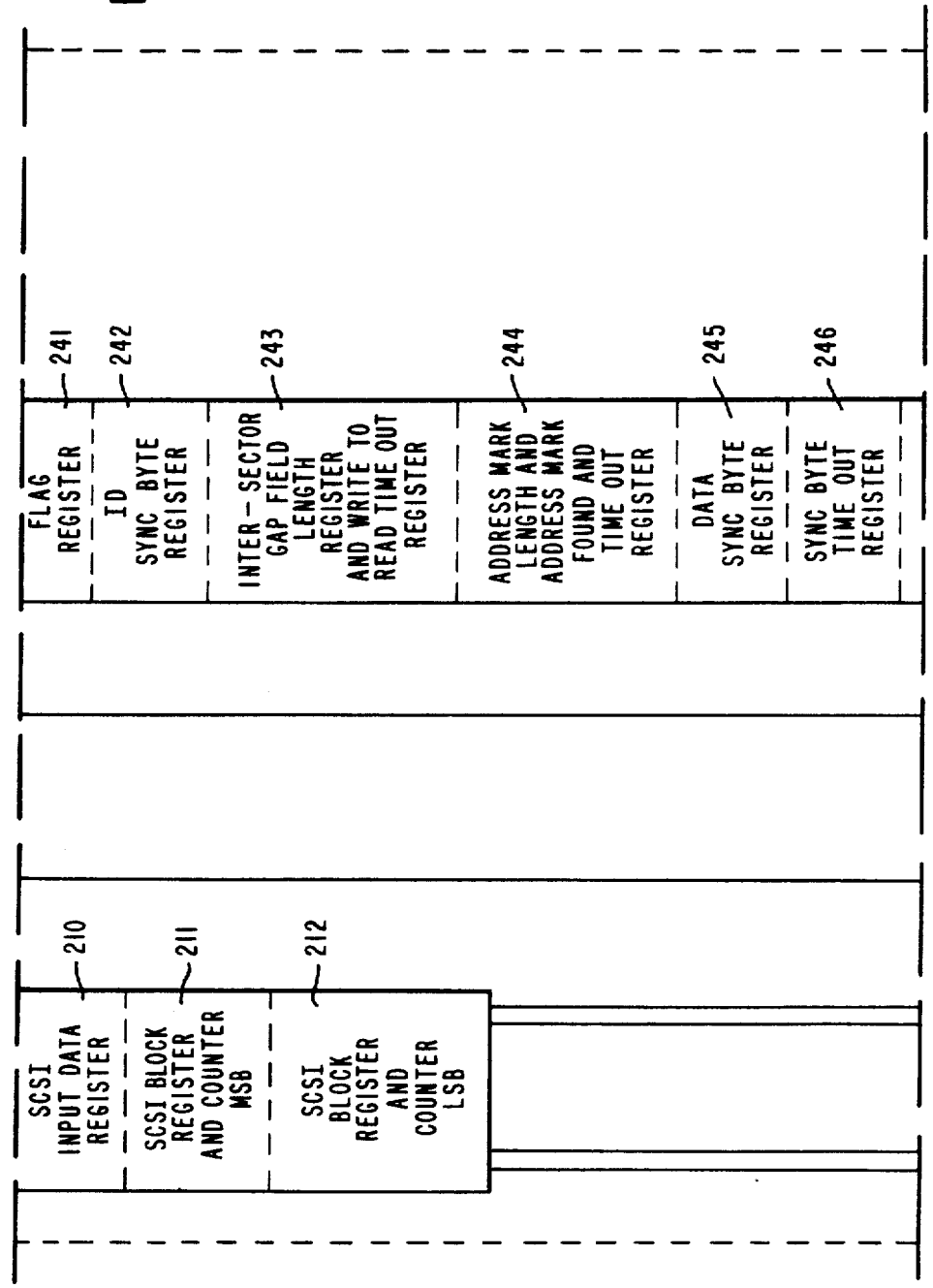

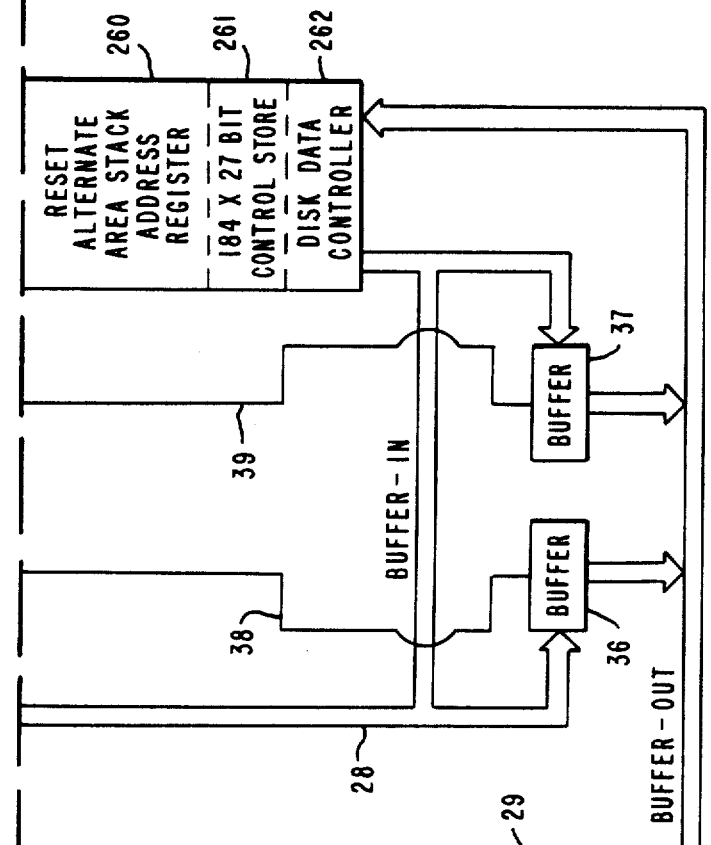

ARCHITECTURAL ARRANGEMENT FOR A SCSI DISK CONTROLLER INTEGRATED CIRCUIT

BACKGROUND OF THE INVENTION

The invention relates to data processing systems and more particularly to an architectural arrangement for a SCSI disk controller integrated circuit (SDC IC) for transferring data between a disk memory and a SCSI bus of a data processing system.

Soon after the completion of the ANSI X3.131 standard for a small computer system interface (SCSI) various designs for SCSI disk controllers began to be implemented. The initial designs were implemented using off-the-shelf SSI, MSI, and LSI logic circuits. This approach led to SCSI disk controllers which were physically large and which could only be accommodated by large computer housings or disk memory housings. A good example of this is shown and discussed in the article "Single-board Controllers Manage More Than One Mass-storage Medium" appearing in ELECTRONIC DESIGN Vol 31, Issue No. 6 on pages 131 through 138. Having large computer/disk housings to accommodate a large printed circuit board with a large population of integrated circuits for a new SCSI disk controller was counter to the direction of the small computer industry, which is to make equipment smaller. Thus, to keep in step with the small computer industry with respect to physical size, a very large scale SCSI disk controller integrated circuit (SDC IC) is needed to replace most of the off-the-shelf SSI, MSI, and LSI circuits.

In addition to the physical size considerations, a SCSI disk controller which has numerous discrete logic circuits has high manufacturing costs over a SCSI disk controller which uses a SDC IC VLSI chip for many of the operations. Each electronic part takes time to locate and insert properly. Furthermore, each lead which is inserted has a probability of not making a proper electrical connection because of insertion/soldering errors. Such errors must be individually tested and corrected, which incurs the labor cost of a highly skilled technician. Thus, to reduce the manufacturing costs and the ultimate consumer expense, a SCSI disk controller using VLSI circuitry is needed to reduce the total part count.

It is an object of this invention to provide a SCSI disk controller which is not physically large relative to the small disk systems currently existing in the industry.

It is another object of this invention to provide an architectural arrangement for a SDC IC.

It is a further object of this invention to provide an architectural arrangement for a very large scale SDC IC for use, in conjunction with a small number of other electronic parts, to transfer data between a SCSI bus and a disk memory bus.

SUMMARY OF THE INVENTION

Briefly stated, in accordance with one aspect of the invention, the foregoing objects are achieved by providing a SCSI disk controller circuit for transferring digital data between a SCSI bus and a disk interface according to a control program, including a read only memory device for storing the control program, a microprocessor device connected to the read only memory device for executing the control program, a random access memory device connected to the read only memory device and the microprocessor device for storing data according to the control program, and a SCSI disk controller integrated circuit device connected to and cooperating with the microprocessor device for controlling the transfer of data between the SCSI bus and the disk interface.

In another aspect of the invention the foregoing objects are achieved by providing a SCSI disk controller integrated circuit for use with a SCSI bus, a microprocessor executing a control program, and a disk interface including a SCSI data and control device for transferring data and control signals to and from the SCSI bus in cooperation with the microprocessor, a buffer device connected to the SCSI data and control device for temporarily storing data as the data is being transferred, a buffer control device connected to the SCSI data and control device and the buffer device for controlling the transfer of data into and out of the buffer device, an error detection and correction device connected to the disk interface and connected to and cooperating with the microprocessor for detecting or correcting the data transferred between the error detection and correction device and the disk interface, and a disk data and control device connected to the buffer device and the buffer control device for controlling the transfer of data between the error detection and correction device and the buffer device in cooperation with the buffer control device. Also included is a direct memory access device that is connected to the SCSI data and control device the buffer control device and the disk data and control device for controlling the transfer of data, which was inputted from the disk interface, from the buffer device to the SCSI data and control device; and the transfer of data, which was inputted from the SCSI bus, from the buffer device to the disk data and control device.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in/which:

FIGS. 3A through 3F when assembled according to the map of FIG. 3 provide a more detailed block diagram of the architectural arrangement of the SDC IC.

DESCRIPTION OF THE PREFERRED EMBODIMENT

Figure 1A:
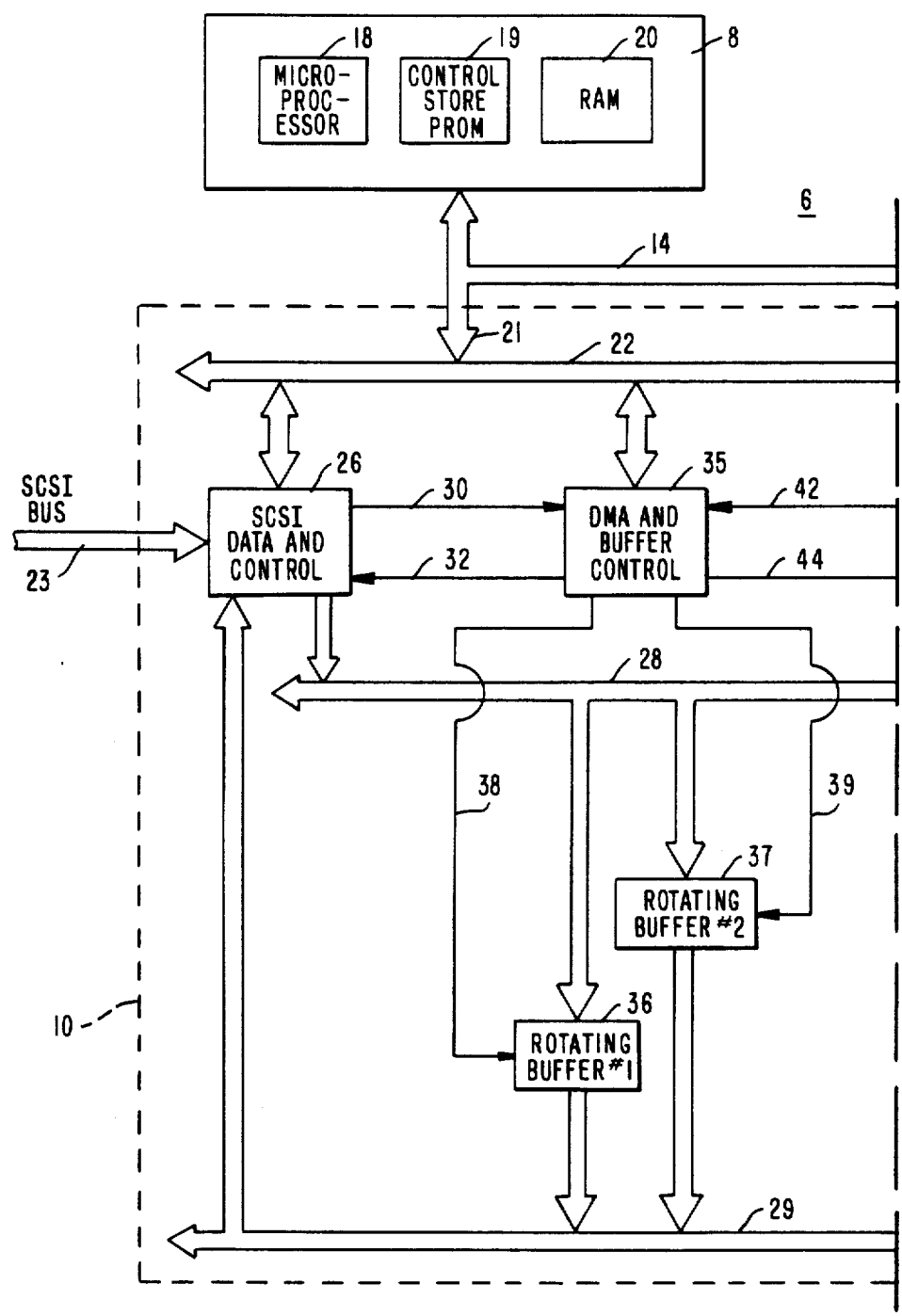
FIGS. 1A and 1B when joined along the heavy dashed lines provide a block diagram of the architectural arrangement of the SCSI disk controller.
Figure 1B:
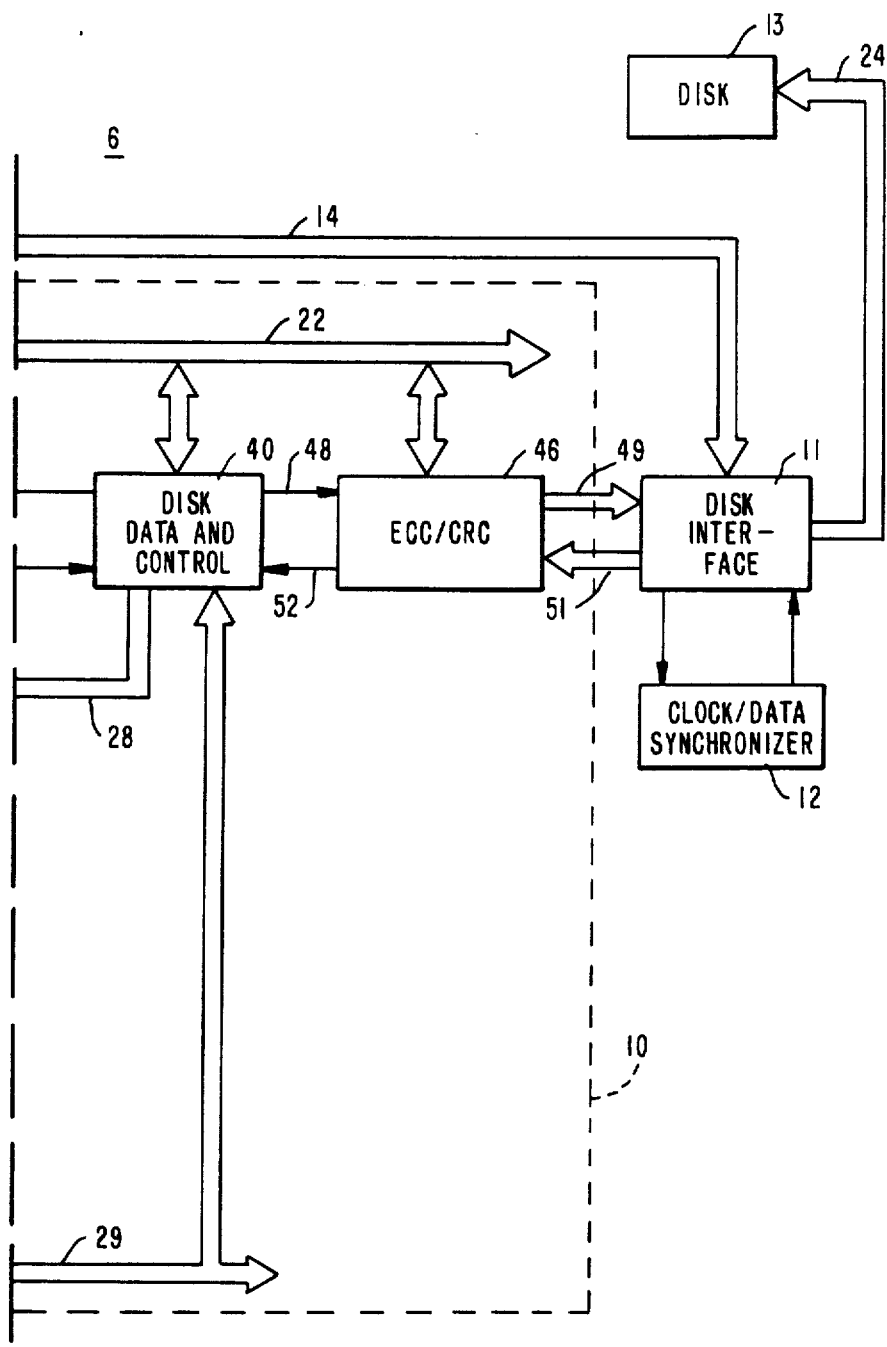

FIGS. 1A and 1B, joined along line A—A, form a block diagram showing the major functional blocks of a SCSI disk controller 6 according to the present invention. The SCSI disk controller 6 includes a control block 8, a SDC IC 10, a disk interface 11, and a clock-and-data synchronizing device 12.

The control block 8 has a microprocessor 18, a control store read only memory (ROM) 19 and a random access memory (RAM) 20. In the preferred embodiment, these three features of the control block 8 are on three separate integrated circuits; however, it will be evident that in some applications these three features of the control block 8 could reside on a single integrated circuit.

Figure 2A:
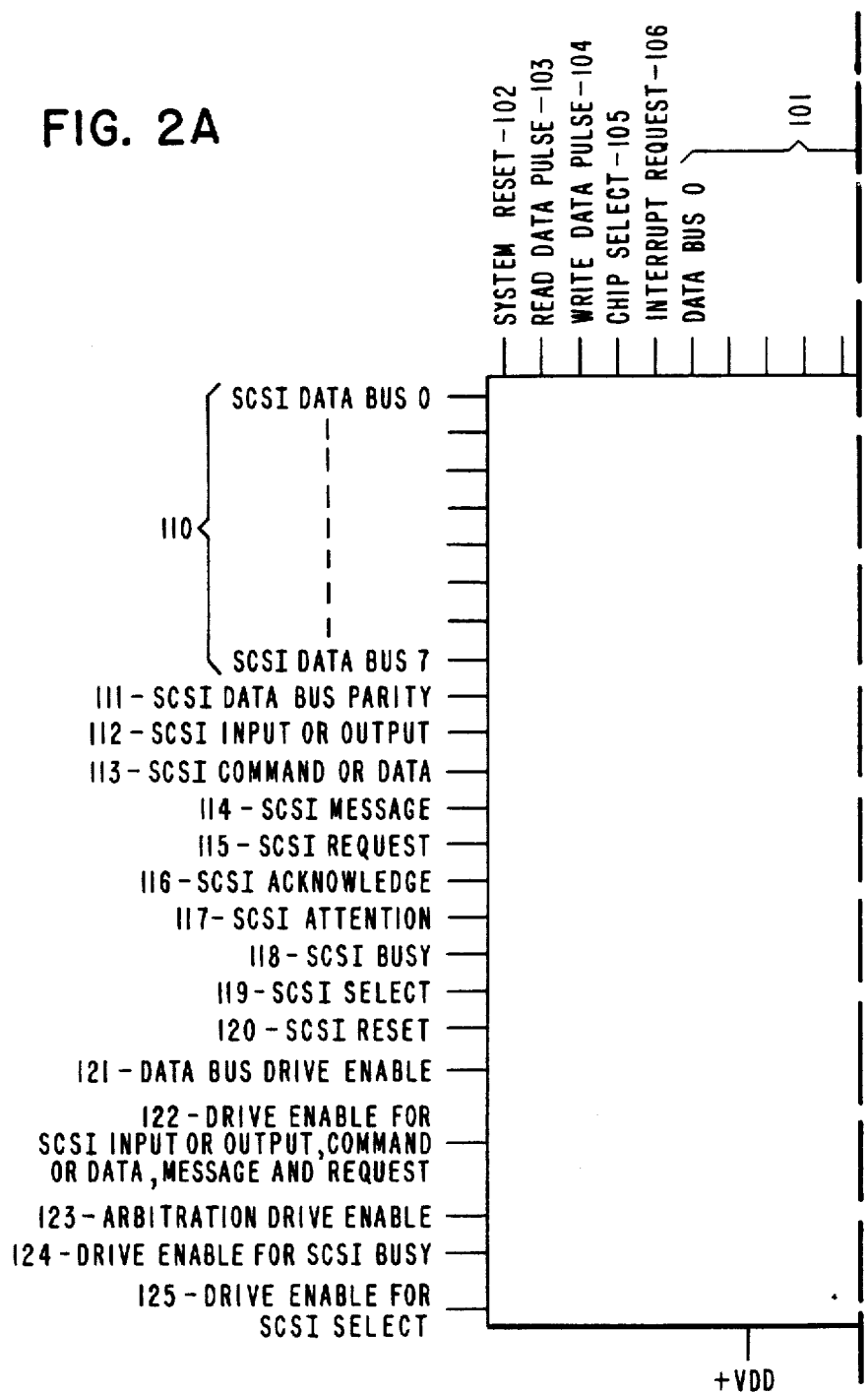
FIGS. 2A and 2B when joined along the heavy dashed lines provide a block diagram showing the data and control signals connected by the various buses to the SDC IC.
Figure 2B:
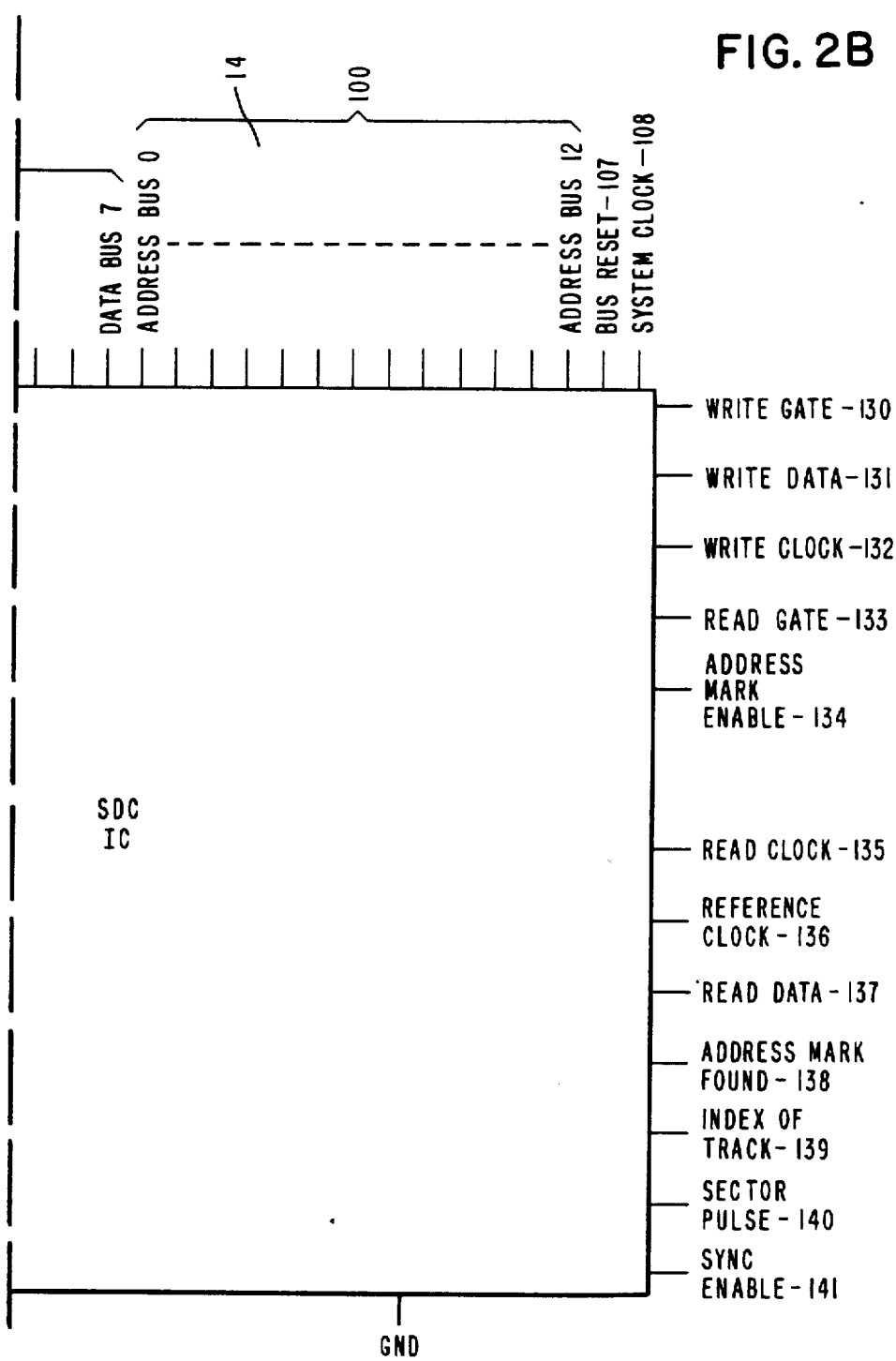

The microprocessor 18 is connected to the SDC IC 10 by a data and control bus 14. As shown in FIGS. 2A and 2B, the data and control bus has a total of twenty-eight (28) lines. Of these 28 lines, thirteen (13) lines form a parallel address bus 100 inbound to the SDC IC 10 from the microprocessor 18 for addressing the memory mapped locations 0000–17 FF in hexa-decimal notation, and eight (8) lines form a bidirectional data bus 101 for the transfer of data. A system reset line 102 is connected to the SDC IC 10 from the microprocessor 18 for the resetting of all the internal registers of the SDC IC 10. A read data pulse line 103 is connected as an input from the microprocessor 18 to the SDC IC 10 for strobing data onto the bidirectional data bus 101 from the SDC IC internal registers. A write data pulse line 104 is connected as an input to the SDC IC 10 from the microprocessor 18 for strobing data on the bidirectional data bus 101 into SDC IC internal registers. A chip select line 105 is connected as an input to the SDC IC 10 from the microprocessor 18 for reading or writing the data on data bus 101 to the address indicated by the address bus 100. An interrupt request line 106 is connected as an output from the SDC IC 10 to the microprocessor 18 for interrupting the microprocessor 18 in order to request service of the data in internal registers of the SDC IC 10. A bus reset line 107 is connected as an output from the SDC IC 10 to the microprocessor 18 to non-maskably interrupt the microprocessor in the event of a reset of the SCSI bus 23. The last of the twenty-eight (28) lines is a system clock line 108 which is connected as an input to the SDC IC 10 from the microprocessor to provide a time base for the SDC IC 10 and its internal circuits to be described later.

Referring back to FIGS. 1A and 1B, the ROM 19 and the RAM 20 contain data and instructions for operating the microprocessor 18, which in turn operates the SDC IC 10 to asynchronously transfer data between the SCSI bus 23 and the disk interface 11 for ultimate storage on a disk drive 13. For the most part the microprocessor 18 reads and writes data to the large number of internal registers of the SDC IC 10, as well as, interprets the contents for programmed processing according to the instructions stored in ROM 19 and RAM 20. In this manner, the microprocessor 18 performs the SCSI protocol and arbitration functions, the error correction function by solving the error correcting code polynomial and returning the corrected data, and general system processing to keep the SDC IC 10 functioning. A listing of the control program for the microprocessor 18 is given in Appendix A.

The microprocessor bus 14 becomes SDC bus 21 once inside the chip where the discrete control lines 102–108 go to their respective register destinations, which will be described later. The address bus 100 and the data bus 101 portions of SDC bus 21 are connected to almost all after registers and memory portions of the SDC IC 10 by data and control bus 22. In this manner, almost every action of the SDC IC 10 is sampled and controlled by the microprocessor 18 over the SDC bus 21 and the data and control bus 22. The two exceptions are portions of a DMA buffer control circuit 35 and a disk data and control circuit 40, both of which will be described later.

The primary function of the SDC IC 10 is to provide the interface between a host computer (not shown) by way of a SCSI bus 23 (see FIG. 1A), and a disk drive 13, such as a Winchester hard disk, by means of a disk bus 24 (see FIG. 1B).

Referring again to FIGS. 2A and 2B, the SCSI bus 23 consists of a total of twenty-three (23) signal lines which are connected to the SDC IC 10. Eight (8) lines, which are designated as SCSI data bus 0 through SCSI data bus 7, comprise a bidirectional SCSI data bus 110 for transferring eight (8) bits of parallel data onto or off of the SDC IC 10. A SCSI data bus parity line 111 inputs a signal which commands the SDC IC 10 to interpret the data on SCSI data bus 110 as either having odd-parity or no-parity depending on the state of the SCSI data bus parity line 111. A SCSI input or output line 112 is connected to an output of the SDC IC 10 and the signal level is outputted to the SCSI input or output line 112 to indicate the direction of data on the SCSI data bus 110. A low signal indicates a data transfer from the SDC IC 10 to the SCSI data bus 110, and a high signal indicates a data transfer in the opposite direction. A SCSI command or data line 113 is connected to the SDC IC 10 which outputs a signal indicating whether the information appearing on SCSI data bus 110 is to be interpreted as a command or as data. A low signal indicates the information on SCSI data bus 110 is a command, while a high signal indicates the information is data. A SCSI message line 114 is connected to an output of the SDC IC 10 which outputs a signal that sends a preselected message over the SCSI bus 23 when the output to line 114 is low. A SCSI request line 115 is connected to an output of the SDC IC 10 which outputs a signal that requests a request/acknowledge sequence when the line 115 is low. A SCSI acknowledge line 116 is connected to an input of the SDC IC 10 and inputs a signal which, when low, completes a request/acknowledge sequence. A SCSI attention line 117 is connected to an input of the SDC IC 10 and inputs a signal which, when low, indicates the existence of an attention condition as defined by the SCSI standard. A SCSI busy line 118 is a bidirectional connection to the SDC IC 10 which any device connected thereto may drive with a low signal to indicate a busy condition of the SCSI data bus 110. A SCSI select line 119 is a bidirectional line connecting to the SDC IC 10, which when driven low by the SCSI select line 119, selects the SCSI bus 23 as the active SCSI bus, and if driven low by the SDC IC 10, re-selects the SCSI bus 23 as the active SCSI bus. A SCSI reset line 120 is connected to an input of the SDC IC 10 and if the signal on the SCSI reset line 120 is driven low indicates a reset condition exists for the SCSI bus 23. A SCSI data bus drive enable line 121 is connected to an output of the SDC IC 10 which, when driven low by the SDC IC 10, enables external differential drivers for the SCSI data bus 110 and the SCSI data bus parity line 111. A SCSI drive enable line 122 is connected to an output of the SDC IC 10 which, when the SDC IC 10 drives the line 122 to a low level, enables external differential drivers for lines 112, 113, 114, and 115. A SCSI arbitration drive enable 123 is connected to an output of the SDC IC 10 which, when driven low by the SDC IC 10 enables an external circuit to drive the preselected line of the SCSI data bus lines 110 during an arbitration for the SCSI bus 23. A drive enable line 124 is connected to an output of the SDC IC 10 which, when driven high by the SDC IC 10, enables an external driver for the SCSI busy signal. A drive enable line 125 is connected to an output of the SDC IC 10 which, when driven to a high level, enables an external differential driver for the SCSI select line 119. All of these connections are according to the aforementioned SCSI standard.

The disk interface 11 is connected to the SDC IC 10 by an output bus 49 and an input bus 51. The output bus 49 has: a write gate line 130 which enables the disk interface 11 to write NRZ write data from the SDC IC 10 to the disk 13, a write data line 131 which carries the NRZ write data to be written from the SDC IC 10 to the disk 13, a write clock line 132 which carries the same clock signal to the disk interface 11 that is used by the SDC IC 10 to clock the NRZ write data on to the line 131, a read gate line 133 which when driven low by the SDC IC 10 enables the disk interface 11 to read data from the disk 13, and an address mark enable line 134 which when driven low by the SDC IC 10 enables the writing of an address mark to the disk 13 if the write gate line 130 is concurrently driven low. The output bus 51 of the disk interface 11 has: a read clock line 135 which is connected to the SDC IC 10 and inputs a read clock signal which is valid when the read gate line 133 is active and phase lock loop synchronization is established, a reference clock line 136 which is connected to the SDC IC 10 and provides an input clock signal from which the signal on the write clock line 132 is derived, a read data line 137 which is connected to the SDC IC 10 and inputs NRZ data from the disk 13 in sychronization with the signal on the read clock line 135, an address mark found line 138 which is connected to the SDC IC 10 and provides a low level to enable the SDC IC 10 to search for either a data synchronize byte or an ID synchronize byte, an index of track line 139 which is connected to the SDC IC 10 and indicates the beginning of a track by the leading edge of a pulse, a sector pulse line 140 which indicates to the SDC IC 10 by a leading edge of a sector pulse the start of a sector of a hard sectored drive, and a SYNC enable line 141 which is connected to the SDC IC 10 and enables a SYNC byte comparison in order to determine a byte boundary for a read operation.

Referring again to FIGS. 1A and 1B, a SCSI data/control circuit 26 in the SDC IC 10 is connected to the data/control bus 22, the SCSI bus 23, a buffer-in bus 28, and a buffer-out bus 29. The SCSI data/control circuit 26 provides the registers that enable the microprocessor 18 to control and sample the SCSI interface signals. This allows a user to implement in software either a portion or all of the SCSI protocol. User software for implementing the SCSI protocol resides in the RAM 20, stored there in a manner well known in the art. The SCSI data/control circuit 26 also includes arbitration circuitry which allows the microprocessor 18 to arbitrate for a logical connection to the SCSI bus 23. When the SCSI data/control circuit 26 wins the arbitration, a control signal is transmitted over a SCSI request bus 30 to indicate that the SDC IC 10 has the exclusive logical connection to the SCSI bus 23. Read and write control signals are also received by the SCSI data/control circuit 26 over a R/W control bus 32 to control the reading and writing of data between the SCSI bus 23, the buffer-in bus 28 and the buffer-out bus 29. A buffer control circuit 35 is connected to and controls a pair of buffers 36 and 37 by control lines 38 and 39. With this circuit, one buffer 36 or 37 can be filling with data from the buffer-in bus 28 while the other buffer 37 or 36 is writing data to the buffer-out bus 29, thereby, providing an almost continuous transfer of digital data.

A disk data/control circuit 40 shown in FIG. 1B is connected between the data/control bus 22 and the buffer-in and buffer-out buses 28 and 29. The disk data/control circuit 40 includes a disk arbitration circuit which transmits a disk request signal over a disk request bus 42 to the buffer control circuit 35 shown in FIG. 1A when the microprocessor 18 wins the arbitration of the disk bus 24 for the SDC IC 10. Read and write control signals are sent by the buffer control circuit 35 to the disk data/control circuit 40 over a control bus 44 to control the reading and writing of disk data. It will thus be understood that when data is to be transferred between the SCSI bus 23 and the disk bus 24, the microprocessor 18 arbitrates for the SCSI bus 23 by the SCSI data and control circuit 26, and arbitrates for the disk bus 24 by the disk data/control circuit 40. When the signals on the SCSI request bus 30 and the disk request bus 42 indicate that the microprocessor 18 has won the respective arbitrations, the buffer control circuit 35 controls the reading of data from the buffer-in bus 28 and the writing of data to the buffer-out bus 29. The direction of the data transfer between the SCSI bus 23 and the disk bus 24 is controlled by the R/W control signals over buses 32 and 44 from the buffer control circuit 35. An error detection and correction circuit 46 is located between the disk data/control circuit 40 and the disk interface circuit 11 which is connected externally to the SDC IC 10. The error detection and correction circuit 46 adds error correction code (ECC) bits or cyclic redundancy code (CRC) bits to the serial data transferred from the disk data/control circuit 40 over a serial bus 48. The information thus transferred over the serial bus 48 is serially written to the disk interface 11 over the output bus 49. Data errors in the serial data, which have been read from the disk 13 via disk interface 11 over the input bus 51, are detected and, when desired, corrected in a well known manner by the error detection and correction circuit 46. The error detected/corrected data is subsequently supplied to the disk data/control circuit 40 over a serial data bus 52.

The disk interface 11 is connected to the data/control bus 14, as well as the disk bus 24, such that control signals may be received directly from the microprocessor 18. A clock/data synchronizer circuit 12 is connected to the disk interface 11 for synchronizing the circuitry of the disk interface 11 with the particular disk drive 13 connected to the disk data bus 24. Depending upon the disk drive 13, the clock/data synchronizer 12 may not be required since in some types of disk drives a synchronizer circuit is included.

A buffer options circuit (not shown) may be connected to the buffer-in bus 28, the buffer-out bus 29, and an external buffer (not shown) when it is desirable to use an external buffer rather than, or in addition to, the internal buffers 36 and 37 of FIG. 1A. The external buffer might be used, for example, as an external cache buffer or an external track buffer.

Figure 3A:
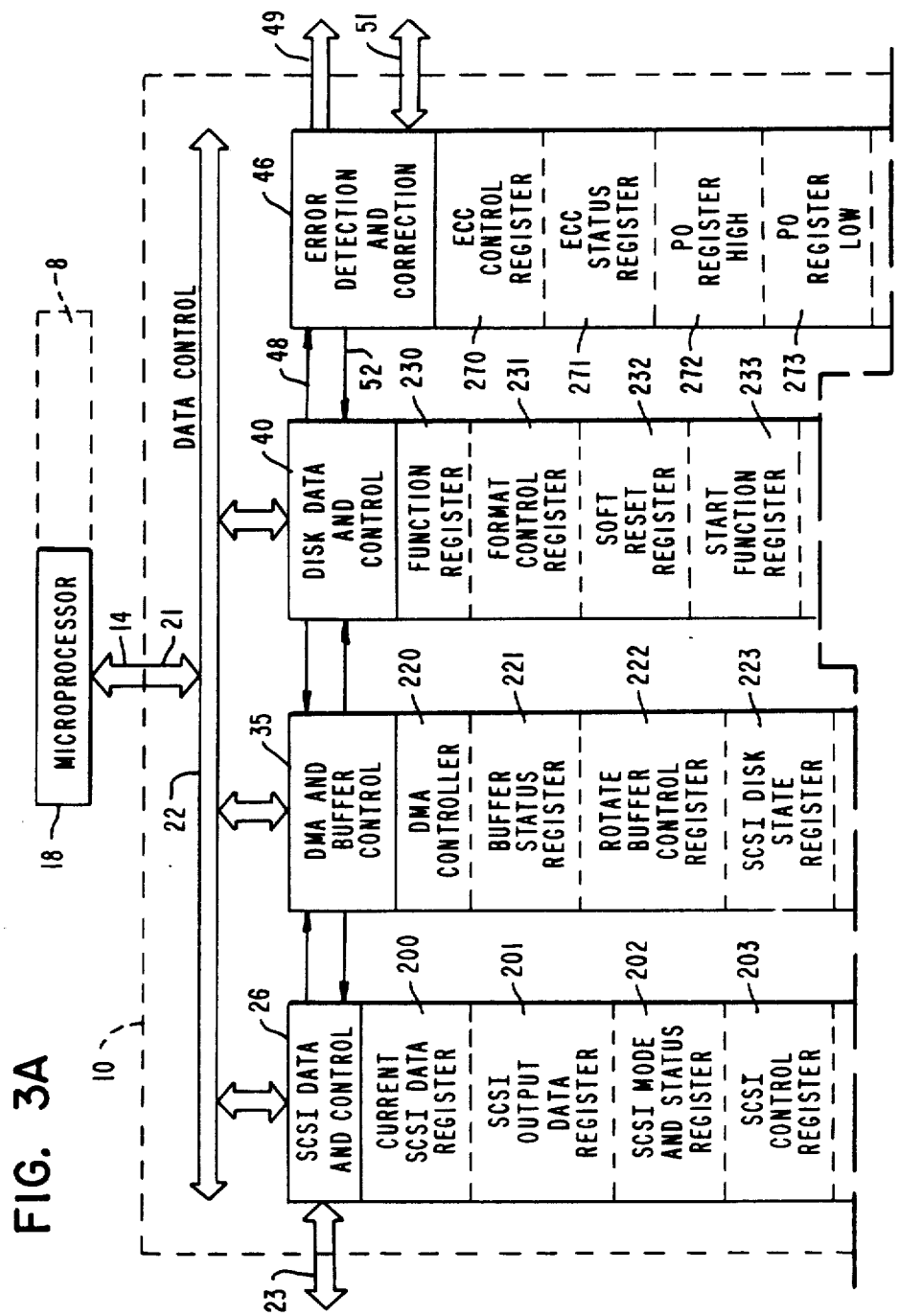
Figure 3D:
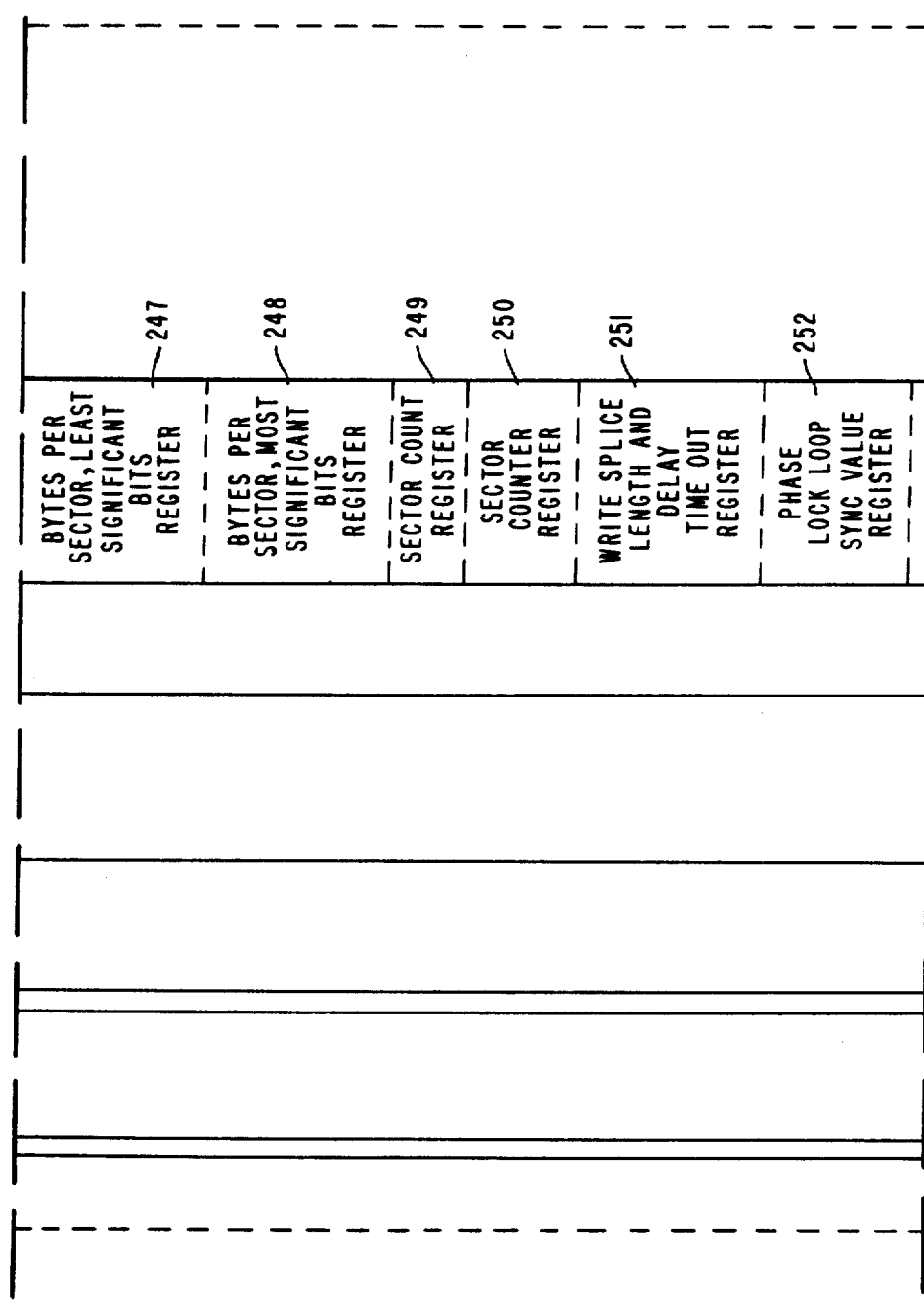
Figure 3E:
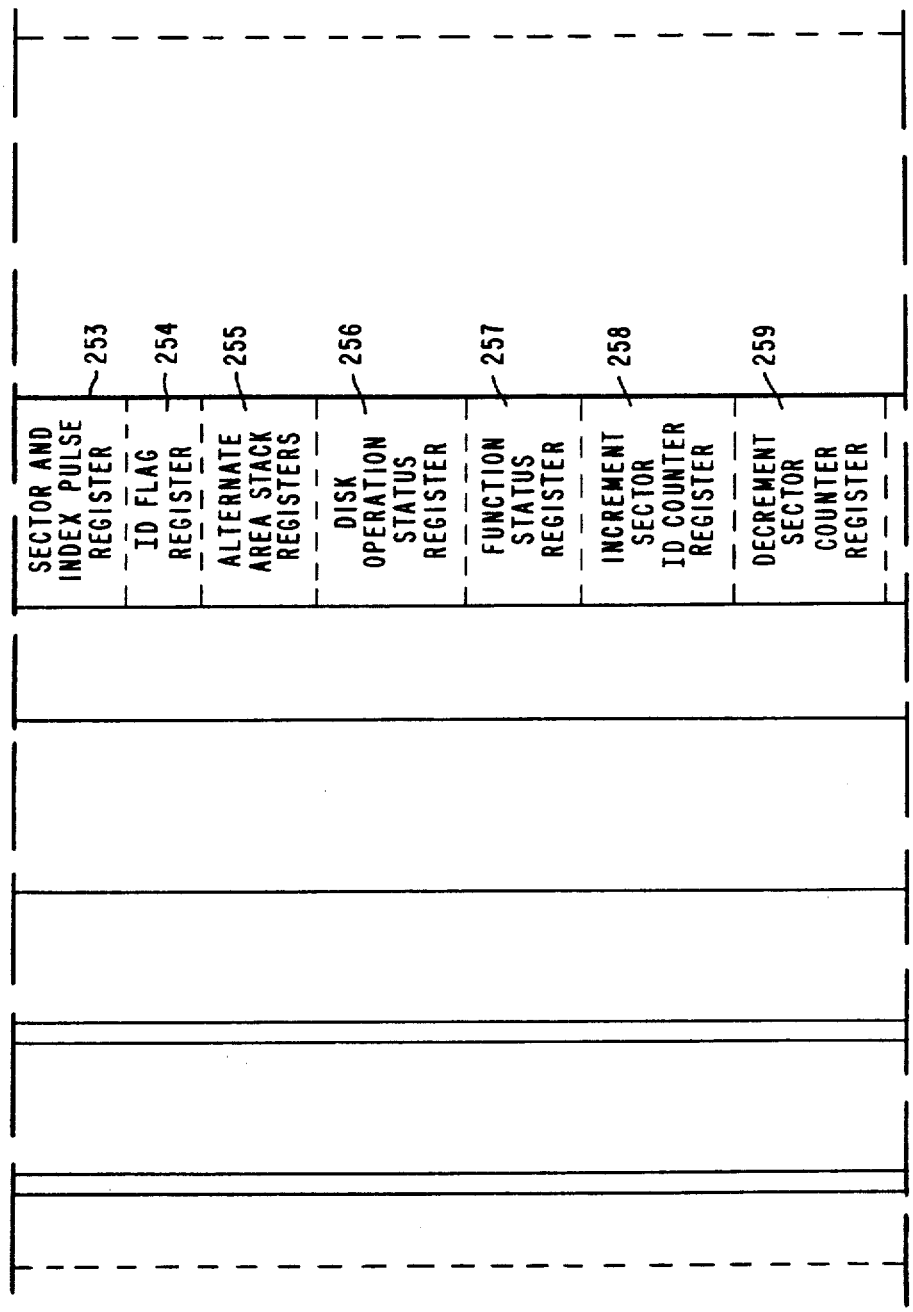

FIGS. 3A through 3F, when assembled according to the plan of FIG. 3, form a detailed block diagram of the SDC IC 10 illustrating the arrangement of the numerous control and status registers within the main functional blocks illustrated in FIGS. 1A and 1B. Referring now to FIGS. 3A through 3F, the system bus 14 transfers address and data information between the microprocessor 18 and the SDC IC 10. As previously mentioned, the system bus 14 connects the SDC bus 21 and then into the data and control bus 22. The data and control bus 22 connects to the SCSI data and control circuit 26, the buffer control circuit 35, and the disk data/control circuit 40, for the transfer of address and data information. The SDC IC 10 is able to transfer data very rapidly because of its architecture which separates the control functions from the data transfer functions. The control and status registers within the SDC IC 10 are addressed directly by the parallel address bus portion of the data and control bus 22, and accessed by the parallel data bus portion of the data and control bus 22, which correspond to the address bus 100 and the data bus 101 respectively shown in FIGS. 2A and 2B, under the supervision and/or direct control of the microprocessor 18. The data transfer functions are supervised by the microprocessor 18, but the transfer itself is controlled asynchronously by three controllers within the SDC IC 10, which will be described later.

The SCSI data and control block 36 has thirteen (13) registers. A current SCSI data register 200 reads and temporarily stores the current data on the SCSI data bus 110 until reset or overwritten by the next current data on the SCSI data bus 110. A SCSI output data register 201 stores a data byte to be written to the SCSI data bus 110 normally under control of a direct memory access (DMA) controller 220 from one of the buffers 36, 37 via the buffer out bus 29. A SCSI mode and status register 202 has two status bits indicating lost arbitration, and arbitration in progress, respectively; and five mode bits: arbitrate mode, DMA mode, enable SCSI parity checking mode, enable differential drivers for lines 112, 113, 114, and 115 mode (See FIGS. 2A and 2B), and single ended mode. A SCSI control register 203 has seven control bits which are used to control the SCSI command or data line 113, the SCSI message line 114, the SCSI request line 115, the SCSI busy line 118, the SCSI select line 119, and the SCSI data bus lines 110 with the SCSI data bus parity line 111, (See FIGS. 2A and 2B). The current SCSI bus status 1 register 204 has eight status bits which contain the current state of eight control signals of SCSI bus 23: the SCSI input or output signal, the SCSI busy signal, the SCSI acknowledge signal, and the SCSI attention signal. A current SCSI bus status 2 register has two status bits which contain the current status of two SCSI bus 23 control signals: the SCSI data bus parity signal, and the SCSI bus reset signal. A SCSI select enable register 206 contains a mask, which is used during a select operation, having a single ID bit located in one of the eight bit positions. A SCSI interrupt status register 207 contains seven status bits which indicate the presence of an interrupt conditions including: a SCSI buffer parity error condition, a SCSI direct memory access bus parity error, a SCSI data bus parity error during a read from the current SCSI data register 200, a SCSI select bus parity error indicating a bus parity error during a selection attempt with the mask from the SCSI select enable register 206, a SCSI select received indicating a match with the mask from the SCSI select enable register 206, a SCSI block end of procedure received which indicates that the last byte of a direct memory access procedure has been loaded into a SCSI input data register 210 (described below), and a SCSI bus reset received which indicates that a SCSI bus reset command has been received. A SCSI start DMA send register 208 initiates a SCSI send transfer when anything is written to it after the DMA mode bit in the SCSI mode and status register 202 is set. A SCSI start DMA receive register 209 initiates a SCSI receive transfer when anything is written to it after the DMA mode bit in the SCSI mode and status register 202 is set. A SCSI input data register 210 contains data previously latched from the SCSI data bus 110 (See FIGS. 2A and 2B), when operating in the direct memory access mode. A SCSI block register and counter MSB 211 contains the eight most significant bits of a data block count. A SCSI block register and counter LSB 212, on the other hand, contains the eight least significant bits of the same data block count. These block counters keep count of the data to be transferred across the SCSI data bus 110 in an individual block. When the last byte of the data block has been transferred, this is an end of procedure for the transfer. The counters 211, 212 are loaded when the Pause bit of the buffer status register 221 (discussed below) is set.

The DMA and buffer control circuit 35 contains two controllers and seven registers. The buffer status register 221 has six status bits used for storing some of the states of the buffer controller 228. The six states are: Pause, buffer available for disk use, buffer completed with disk transfer, microprocessor parity error, buffer rotation state, and diagnostic SCSI DMA request which is used only for diagnostics. The Pause status bit when it is set indicates that the buffers 36, 37 are inactive with respect to data transfers. The buffer available status bit is set to indicate that one of the buffers 36, 37 is ready for disk data transfer use. The buffer completed with disk transaction bit is set when the buffer 36 or 37 has been filled with disk data during a disk write. The buffer rotation bit if reset directs SCSI data requests to the buffer 37 and disk data requests to buffer 36; and if set, the assignments and directions are reversed. The remaining two status bits are self-explanatory. A rotate buffer control register 222, when written to by the microprocessor 18, causes the buffers 36, 37 to rotate and causes the buffer rotate bit of the buffer status register 221 to change state. A SCSI disk state register 223 contains seven status bits which are used during diagnostic testing of the SCSI data and control circuit 26 and the disk data and control circuit 40. A set disk buffer available register 224 when written to, sets the disk buffer available bit of the buffer status register 221. A reset buffer available register 225, when written to, resets the disk buffer available bit of the buffer transfer complete register 221 to indicate that either buffer 36, or 37 is unavailable for disk data. A set data buffer transfer complete register 226, when written to, sets the data transfer complete status bit of the buffer status register 221 which indicates the data transfer between the buffer 36 or 37 and the disk 13 (See FIG. 1B) is complete. Finally, a reset buffer transfer complete register 227, when written to, resets the data transfer complete status bit of the buffer status register 221 which indicates to the respective buffer 36, or 37 to be filled by data from the disk 13 (See FIG. 1B).

The DMA and buffer control circuit 35 also includes a DMA controller 220 which provides a direct memory access between the SCSI data and control circuit 26 or with disk data and control circuit 40, and the buffers 36, 37 during a data transfer; as well as, a buffer controller 228 which controls the rotation of the buffers 36, 37, the loading and decrementing of the block counters 211 and 212 and the setting and resetting of the status bits of the buffer status register 221. The buffer controller portion of the DMA and buffer control circuit 35 also controls the connection of the buffer in bus 38, and the buffer out bus 29 between the buffers 36, 37; and the SCSI data and control circuit 26 and the disk data and control circuit 40.

The disk data control circuit 40 has 32 registers 230-260, a 184 word by 27 bit control store 261, and a disk data controller 262. The function register 230 has eight bits which are decoded according to Table I to determine what function the disk data control circuit 40 will perform. A format

TABLE 1
FUNCTION REGISTER

| 7 | 6 | 5 | 4 | 3 | 2 | 1 | 0 | |
|---|---|---|---|---|---|---|---|---|
|   | 1 | 1 | 1 | 1 | 1 | 1 |   |   |
|   | 0 | 0 | 0 | 0 | 0 | 0 | 0 | Internal Diagnostics |
|   |   |   |   |   |   |   |   |   |
| X | A | X | 0 | 0 | 1 | X |   | Write Data Without EEC |
| X | A | X | 0 | 1 | 0 | 0 |   | Read Data Without ECC |
| X | A | X | X | 1 | 0 | 1 |   | Verify Data |
| X | A | X | 1 | 0 | 1 | X |   | Write Data With ECC |
| X | A | X | 1 | 1 | 0 | 0 |   | Read Data With ECC |
|   |   |   |   |   |   |   |   |   |
| X | X | X | X | 0 | 0 | X |   | Write Track Format |
| X | X | X | X | 0 | 1 | X |   | Format Single Sector |
| X | X | X | 0 | 1 | X | X |   | Read Track Format |
| X | X | X | 1 | 1 | X | X |   | Read ID |
|   |   |   |   |   |   |   |   | Undefined |

Notes:
(X) Indicates Don't Care
(A) Indicates, If 1 = Enable 2 byte sector length indicator strip on short sector reads, and enable 2 byte sector length indicator append on short sector writes; If 0 = Disable the short sector length strip or append function.

control register 231 has four bits which indicate the format of the disk drive 13 (See FIG. 1B). If bit zero is set, a hard sector format is indicated and bit one is ignored. If bit one is set and bit zero is reset, address mark A1 soft sector formatting is indicated. If bit one is reset and bit zero is reset, sector mark formatting is indicated. A soft reset register 232 has a single control bit which when set causes the disk control sequence to terminate, all the control bits to reset, and the disk data controller 262 to enter a standby mode; thereby causing the buffer controller 228 to go to the Pause state. A start function register 233 when written to, causes a function status register 257 and a disk operation status register 257 and a disk operation status register 256 (described below) to reset, and also initiates the function defined by the function register 230. A reset ID found register 234 when, written to, resets the ID found bit of the disk operation status register 256. An index gap length and defective sector flag register 235 contains the value of the index gap length during format commands, and the defective sector flag literal during ID searches. A cylinder MSB register 236 and a cylinder LSB register 237 together form the most significant eight bits and the least significant eight bits respectively, of a sixteen bit cylinder address. This address is compared with the cylinder's data read from the disk 13 (See FIG. 1B) to determine if the disk heads are positioned over the correct cylinder. If the two sets of cylinder data do not match during a sector search, the seek error bit of head register 238 contains the head number used in an ID search. During an ID search by the SDC IC 10, the contents of head register 238 are compared with the head data bits from the disk. A section ID register and counter 239 contains the number of the present sector which is used in an ID search. Upon a successful ID search the ID sector ID register and counter 239 is incremented by the SDC IC 10. A phase lock loop length register 240 contains eight bits which define the number of bytes that will be in the phase lock loop synchronization field during either a format operation or a write data operation with the disk 13 (see FIG. 1B). A flag register 241 contains an eight bit, user definable flag which can be compared with the flag data read from the disk 13 during an ID search. If during a sector ID search, the flag data read from disk 13 does not match the contents of the flag register 241, the ID search is terminated. An ID SYNC byte register 242 must contain the value of the ID SYNC byte during an ID search of disk data. The contents of this register must equal the data of the ID SYNC byte of the disk sector data to establish the location and synchronization of the disk sector ID data field within the chosen format. An inter-sector gap length register and write to read time out register 243 stores eight bits supplied from the microprocessor 18 for controlling the length in bytes of the inter-sector gaps used in the format function and format checking function. This register 243 is also used on write data functions to specify the time out from the write gate turn-off to the read gate turn on, which is given by:

$$\text{Time Out Count} = \frac{[\text{Time Out Value is seconds}] - 300 \times 10^{-9}}{200 \times 10^{-9} \text{ seconds}}$$

[Time Out Value is seconds]-300x10-9 Time Out Count =----------------------------------
200x10-9 seconds An address mark length and address mark found time out register 244 contains the length in bytes of the address mark to be written during a soft sector formatting of the disk 13 (See FIG. 1B) or a write data function to the disk 13. This register 244 is also used to control the time out function on a read data operation after a address mark enable operation. A time out count, dependent upon the formatting used, is loaded by the microprocessor 18 into register 244, and the address mark found status must be reached before the register 244 reaches zero or else a time out status occurs. A data SYNC byte register 245 contains a one byte value which during an ID search must equal the data sychronization byte read from the disk 13 (see FIG. 1B) in order to determine the byte boundaries of the disk data. A SYNC byte time out register 246 is loaded with a preselected time out count to determine if an address SYNC byte or.a data SYNC byte is not present in the expected time to prevent misdetection of an address SYNC byte as a data SYNC byte in some disk formats. A bytes per sector least significant bits register 247, and a bytes per sector most significant bits register 248 together form an eleven bit value which denotes the number of bytes of data to be transferred between the SCSI bus 23 and one of the disk data buses 49 or 51 after the format bits are stripped away. This eleven bit value is loaded into the SCSI block registers and counters 211, 212 and the disk data controller 262. A sector count register 249 is loaded by the microprocessor 18 with the number of sectors, 1 to 255, to be transferred during a multi-sector transfer. A sector counter register 250 is loaded from the sector count register 249 at the start of a transfer operation of at least one sector. The sector counter register value decrements as each sector is transferred and when the value decrements to zero the transfer operation terminates. A write splice length and delay time out register 251 is preselected by the program of the microprocessor 18 to provide a delay between the reading of a sector ID field and the writing of data to that sector during a write to disk operation to prevent writing data errors. During a read operation, this same register 251 is used to delay the turning on of the read gate until the write splice areas of the sector have passed, also to prevent data errors. A phase lock loop SYNC value register 252 is loaded by the microprocessor 18 with a value written in the phase lock loop SYNC areas of each sector of the selected disk format. The value in register 252 is used as part of the write and the format operations. A sector and index pulse register 253 has two control bits used during a read operation for indicating that: the leading edge of the disk sector pulse has been detected by setting bit zero to logic one, and the leading edge of the sector index pulse has been detected by setting bit one to logic one. A write operation to register 353 will reset bits zero and one, while a reset of the SDC IC 10 will set both of these bits. An ID flag register 254 normally contains the contents of the disk ID field of the last sector written to or read from, but if a terminate operation is performed by the disk data controller 262, the ID flag register 254 will contain the last sector read instead. To assist in error conditions, an alternate area stack 255 has four locations which are filled according to the contents of the control store 261 and the action of the disk data controller 262 associated with the control store 261. Under normal termination conditions, the alternate area stack 255 holds the alternate cylinder MSB, the alternate cylinder LSB, the value of the alternate head register, and the value of the alternate sector register in that order; however, if the control store 261 is programmed to perform such an action, the alternate area stack 255 under termination for error conditions could instead hold the present cylinder MSB, the present cylinder LSB, the value of the present head, and the value of the last sector read. A reset alternate area stack address register 260, when written to, directs the alternate area stack 255 to the alternate area data if no terminate for error conditions occurs.

The disk operation status register 256, previously referred to, has four status bits. Status bit zero, if set, indicates that the execution of a current function has been terminated, while, if reset, status bit zero indicates that the disk data controller 262 is executing a current function. Status bit one of the register 256, if set, indicates that the current function did not execute to completion and had an error. Status bit one when set also validates the information in the function status register 257 described below. Status bit two, if set, indicates that the ID field of a sector has been found. The ID field and status bit two are used by the microprocessor 18 to make various updates of disk drive control data. Status bit two is reset either by the disk data controller 262 when the end of the data field associated with the ID field which was found is reached, or by writing to the reset ID found register 234. Status bit three, if set, indicates that an ID CRC or ECC error has been detected on a sector which is not involved in the current function. Closely related to the disk operation status register 256 is the function status register 257 which has eight bits that define the error status of eight different functions. The eight different status bits from zero to seven respectively indicate: a sector has not been found, an ID CRC or ECC error has occurred, a data CRC or ECC error has occurred, a data SYNC byte is missing, a disk buffer parity error has occurred, a seek error has occurred, and a flag mismatch error has occurred. Completing the complement of registers of the disk data and control circuit 40 are the previously mentioned increment sector ID counter register 258 which, when written to, increments the value in the sector ID register and counter 239, and the decrement sector counter register 259 which, when written to, decrements the value in the sector counter register 250 by one.

As mentioned previously, the disk data and control circuit 40 also contain the 184 word by 27 bit control store 261 which contains a control program downloaded from the microprocessor 18 across buses 14, 21, and 22 to define the functions to be performed. The control program in the control store 261 is sequenced and executed by the disk data controller 262 to provide the functions of transferring data into the output bus 49 and the input bus 51. The control program also defines how the disk data controller 262 responds to and cooperates with the DMA and buffer control circuit 35 to transfer data onto the buffer in bus 28 during a disk read operation and off of the buffer out bus 29 during a disk write operation in order to keep the data transfer rate through the SDC IC 10 high.

Closely associated with the disk data and control circuit 40 is the error detection and correction circuit 46, which includes seven registers. An error control register 270 contains eight control bits. Control bit zero is loaded by the microprocessor 18 and is the least significant data bit of the error correcting code (ECC) polynomial or the cyclic redundancy code (CRC) polynomial. Control bit zero can be used for diagnostic purposes when any of the ECC/CRC polynomial registers 272-276 is a simple shift register. When control bit one is set to one, the ECC polynomial is put into the write generation mode, and conversely, when bit one is reset to zero, the ECC polynomial is put into read generation mode. When control bit two is set to one, the ECC/CRC polynomial registers 272-276 are connected in the feedback mode, and conversely, when control bit two is reset to zero, the ECC/CRC polynomial registers 272-276 are connected serially in shift register mode. Control bit three, when set, shifts according to the leading edge of the internal clock signal, the P0 registers 272 and 273 one place to the right, or if in CRC mode, shifts according to the leading edge of the internal clock signal, the CRC polynomial in the P0 register 272 one place to the right. Control bit four, when set to one, enables P1 register 274, P2 register 275, and P3 register 276 to shift one place to the right simultaneously with the leading edge of the internal clock. Control bit five controls the internal clock. When the microprocessor 18 sets bit five from zero to one, and internal clock pulse is generated by the error detecting and correcting circuit 46. Also, the microprocessor 18 must reset bit five to zero before another internal clock pulse can be generated. Control bit six, when set to one by the microprocessor 18, enables the correction portion of the error detection and correction circuit 46 to be controlled and executed by the microprocessor 18. If control bit six is reset to zero, control bits zero through five have no effect. Control bit seven, when set to one by the microprocessor 18, resets the ECC/CRC registers 270-276. An ECC status register 271 indicates the status of six special ECC conditions: bit zero when set to one indicates that the eleven lowest bits of the P0 polynomial are equal to the eleven bits of the P1 polynomial; bit one when set to one indicates that the lowest twelve bits of the P0 polynomial are equal to the twelve bits of the P2 polynomial; bit two when set to one indicates that the lowest eleven bits of the P0 polynomial are equal to the eleven bits of the P3 polynomial; bit three is set to one to indicate that the eleven most significant bits of the P0 polynomial are all equal to zero; bit four is set to one to indicate that all of the bits of the P0 polynomial, the P1 polynomial, the P2 polynomial and the P3 polynomial are equal to zero; and bit five is set to one to indicate that the CRC polynomial is zero. For error correction purposes, the microprocessor 18 has read-only access to the P0 high register 272 to P0 bits 14 to 21 and to the P0 low register 273 to P0 bits 11 to 13. These are used by the microprocessor 18 to perform error correction to the data from the disk 13 (see FIG. 1B) when such error correction is selected.

Figure 4:
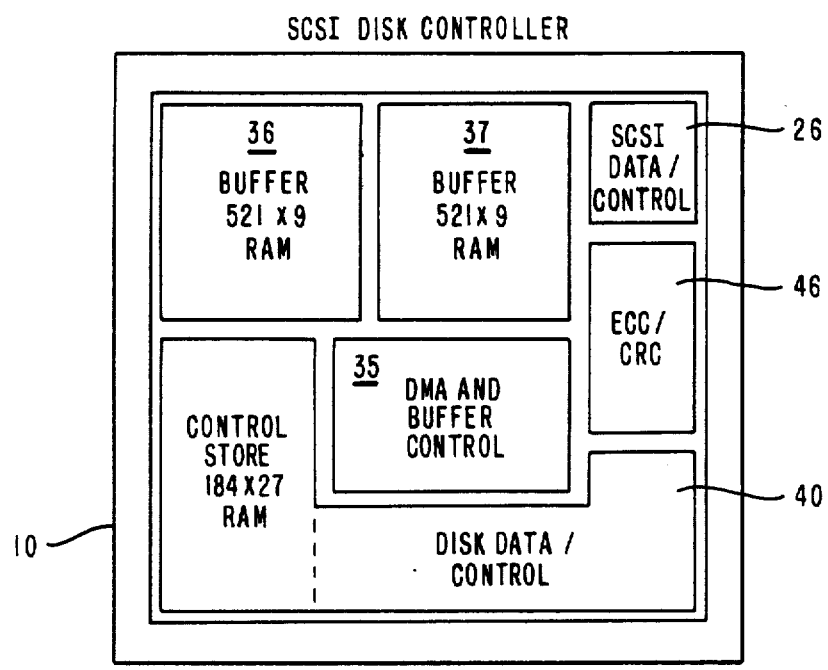
FIG. 4 illustrates the relative VLSI circuit areas of some of the main architectural features of the SDC IC blocks illustrated in FIGS. 1A and 1B.

Referring to FIG. 4, an architectural arrangement for the SDC IC 10 is illustrated. The SDC IC 10 is shown in block diagram form as one semi-conductor die. Representative areas of the semi-conductor die, which correspond to the SCSI data and control circuit 26, the DMA and buffer control circuit 35, the disk data and control circuit 40, and the error detection and correction circuit 46, are shown as smaller blocks within the semiconductor die. Also shown in FIG. 4 are the two rotating buffers 36,37 and the control store 261. Each of the buffers 36,37 holds a maximum of 521 bytes plus 521 parity bits for a total of 4689 bits, which is the reason each buffer occupies so much semiconductor die area. Similarly, the control store 261 holds a maximum of 184 words of twenty-seven (27) bit length for a total of 4968 bits, which is why this feature of the disk data and control circuit 40 is shown separately. By comparison the thirty-two (32) registers of the disk data and control circuit 40 would, if each register were fully implemented with eight bits, hold a maximum of 256 bits. The space between the function blocks represents the area reserved for the various buses which connect the functional blocks together as described previously in the description with regard to FIGS. 1 and 3.

The final architectural arrangement of the preferred embodiment of SDC IC 10 shown in FIG. 4, is the end result of selecting from all the functional blocks of the SCSI disk controller 6 shown in FIGS. 1A and 1B, those functions which will fit onto the semiconductor die and work efficiently together. Moreover, the cost to the customer must always be considered in a commercial product, so some functions that could be included on the semiconductor die of the SDC IC 10 are not included to reduce die size, reduce mask lay out time and increase the number of dice produced per wafer of semiconductor material. An example of a function which could have been included in SDC IC 10, but was deliberately excluded from the present SDC IC architectural arrangement is the microprocessor 18. The improvement in performance by having the microprocessor 18 on the SDC IC 10, could not presently justify the increase in the cost of the extra layout time and the expense per die of the larger dice. This does not mean that in the future a microprocessor could not be put on the SDC IC 10, it simply means that at the present, the architectural arrangement shown in FIG. 4 is the preferred embodiment.

Thus, it will now be understood that there has been disclosed a new architectural arrangement for a SCSI disk controller and for a SCSI disk controller integrated circuit which provide high data throughput rates in a physically small and monetarily inexpensive circuit. As will be evident from the foregoing description, certain aspects of the invention are not limited to the particular details of the example illustrated, and it is therefore contemplated that other modifications or applications will occur to those skilled in the art, such as a SCSI disk controller integrated circuit including a microprocessor therein, it is accordingly intended that the claims shall cover all such modifications and applications which do not depart from the true spirit and scope of the invention.

I claim:

1. A SCSI disk controller arrangement for transferring digital data between a SCSI bus and a disk interface according to a control program comprising:
   ROM means for storing the control program;
   microprocessor means connected to the ROM means for executing the control program therein; and
   SCSI disk controller integrated circuit means, connected to the SCSI bus at a first interface thereof, connected to the disk interface by a disk data input bus and a disk data output bus, and connected to the microprocessor means via a microprocessor bus, for controlling the transfer of data between the SCSI bus and the disk interface under control of the microprocessor means.

2. The SCSI disk controller arrangement as set forth in claim 1, wherein the SCSI disk controller integrated circuit means includes:
   SCSI data and control means for transferring data and control signals between said SCSI data and control means and the SCSI bus in cooperation with the microprocessor means;
   buffer means connected to the SCSI data and control means for temporarily storing data as the data is being transferred;
   buffer control means connected to the SCSI data and control means and the buffer means for controlling the transfer of data into and out of the buffer means;
   error detection and correction means connected to the disk interface and connected to and cooperating with the microprocessor means for detecting or correcting an error in the data transferred between the error detection and correction means and the disk interface; and
   disk data and control means connected to the buffer means and the buffer control means for controlling the transfer of data between the error detection and correction means and the buffer means in cooperation with the buffer control means.

3. A SCSI disk controller integrated circuit for use with a SCSI data bus, a microprocessor executing a control program, and a disk interface; comprising:
   SCSI data and control means for transferring data and control signals to and from the SCSI bus in cooperation with the microprocessor;
   buffer means connected to the SCSI data and control means for temporarily storing data as the data is being transferred;
   buffer control means connected to the SCSI data and control means and the buffer means for controlling the transfer of data into and out of the buffer means;
   error detection and correction means connected to the disk interface and connected to and cooperating with the microprocessor for detecting or correcting an error in the data transferred between the error detection and correction means and the disk interface;

disk data and control means connected to the buffer means and the buffer control means for controlling the transfer of data between the error detection and correction means and the buffer means in cooperation with the buffer control means; and direct memory access means connected to the SCSI data and control means, the buffer control means, and the disk data and control means for controlling the transfer of data, which was inputted from the disk interface, from the buffer means to the SCSI data and control means, and the transfer of data, which was inputted from the SCSI bus, from the buffer means to the disk data and control means.

4. The SCSI disk controller integrated circuit as set forth in claim 3, wherein the buffer means includes a plurality of rotating buffers, each having buffer storage for a plurality of bytes, and may be written to and read from in the rotational manner.

5. The SCSI disk controller integrated circuit as set forth in claim 3, wherein the disk data and control means includes a control store means for receiving and storing from the microprocessor a controller program defining an operation of the disk data and control means.

6. The SCSI disk controller integrated circuit as set forth in claim 4, wherein the disk data and control means includes a control store means for receiving and storing from the microprocessor a controller program defining an operation of the disk data and control means.

7. An architectural arrangement for a SCSI disk controller integrated circuit for use with a SCSI bus, a disk interface circuit, and a microprocessor; comprising in combination:

a SCSI data and control circuit occupying a portion of the SCSI disk controller integrated circuit and having connections for connecting with the SCSI bus;

an error detection and correction circuit occupying a portion of the SCSI disk controller circuit and having connections for connecting with the disk interface circuit;

a disk data and control circuit occupying a portion of the SCSI disk controller integrated circuit and connecting to the error detection and correction circuit;

a DMA and buffer control circuit occupying a portion of the SCSI disk controller integrated circuit and having connections to the SCSI data and control circuit, and the disk data and control circuit;

a first rotating buffer circuit occupying a portion of the SCSI disk controller integrated circuit connected to the DMA and buffer control circuit, and switchably connected to the SCSI data and control circuit and the disk data and control circuit under the control of the DMA and buffer control circuit; and a second rotating buffer circuit occupying a portion of the SCSI disk controller integrated circuit connected to the DMA and buffer control circuit, and switchably connected to the SCSI data and control circuit and the disk data and control circuit under the control of the DMA and buffer control circuit;

whereby data may be transferred between the SCSI bus and the disk interface via at least one of the rotating buffer circuits under control of the DMA and buffer control circuit.

8. The architectural arrangement for a SCSI disk controller integrated circuit according to claim 7, wherein the SCSI data and control circuit arbitrates for access of the SCSI bus under the control of the microprocessor.

9. The architectural arrangement for a SCSI disk controller integrated circuit according to claim 8, wherein data is transferred between one of the rotating buffers and the disk interface via the error detection and correction circuit.

10. The architectural arrangement for a SCSI disk controller integrated circuit according to claim 9, wherein a single bit error in a data transferred between one of the rotating buffers and the disk interface is detected by the error detection and correction circuit, and is corrected by the error detection and correction circuit under the control of the microprocessor running an error correction program.

11. A SCSI disk controller integrated circuit for use with a SCSI bus, a disk interface circuit, and a microprocessor, comprising:

a SCSI data and control circuit occupying a portion of the SCSI disk controller integrated circuit and having connections for connecting with the SCSI bus;

an error detection and correction circuit occupying a portion of the SCSI disk controller circuit and having connections for connecting with the disk interface circuit;

a disk data and control circuit occupying a portion of the SCSI disk controller integrated circuit and connecting to the error detection and correction circuit;

a DMA and buffer control circuit occupying a portion of the SCSI disk controller integrated circuit and having connections to the SCSI data and control circuit, and the disk data and control circuit;

a first rotating buffer circuit occupying a portion of the SCSI disk controller integrated circuit connected to the DMA and buffer control circuit, and switchably connected to the SCSI data and control circuit and the disk data and control circuit under the control of the DMA and buffer control circuit; and a second rotating buffer circuit occupying a portion of the SCSI disk controller integrated circuit connected to the DMA and buffer control circuit, and switchably connected to the SCSI data and control circuit and the disk data and control circuit under the control of the DMA and buffer control circuit.

* * * * *